US 6,496,144 B2

(12) United States Patent
Tanaka et al.

(10) Patent No.: US 6,496,144 B2
(45) Date of Patent: Dec. 17, 2002

(54) ADAPTIVE RECEIVER HAVING ADAPTIVE ARRAY UNIT AND EQUALIZER UNIT

(75) Inventors: Makoto Tanaka, Kariya (JP); Kazuoki Matsugatani, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/967,631

(22) Filed: Sep. 26, 2001

(65) Prior Publication Data

US 2002/0050948 A1 May 2, 2002

(30) Foreign Application Priority Data

Oct. 31, 2000 (JP) ........................................ 2000-333292

(51) Int. Cl.[7] .............................. G01S 3/16; G01S 3/28
(52) U.S. Cl. ...................................... 342/378; 342/383
(58) Field of Search ................................ 342/378, 380, 342/383

(56) References Cited

U.S. PATENT DOCUMENTS 6,018,317 A * 1/2000 Dogan et al. ............... 342/378
6,087,986 A    7/2000 Shoki et al.

FOREIGN PATENT DOCUMENTS

JP          10-210099        8/1998

* cited by examiner

*Primary Examiner*—Theodore M. Blum
(74) *Attorney, Agent, or Firm*—Harness, Dickey & Pierce, PLC

(57) ABSTRACT

An adaptive receiver includes an adaptive array unit and an equalizer unit. In the adaptive array unit, receiving signals of an array antenna are demodulated, weighted by multiplying with a complex weight calculated by an adaptive arithmetic unit, and adaptively combined. In the equalizer unit, propagation path estimation values are calculated from the receiving signals by a propagation path estimating unit, weighted with the complex weight by a complex weight adjusting unit, and adaptively combined. The combined demodulation signal is divided by the combined propagation path estimation value. Thereby, not only the unwanted signal wave of low correlation but also the unwanted signal wave of high correlation can be controlled effectively using an adaptive array antenna.

30 Claims, 16 Drawing Sheets

| PREAMBLE | DATA |

CONVERGENCE

CONSTELLATION (ADAPTIVE)

CONSTELLATION (ADAPTIVE)

CONSTELLATION (ORDINARY)

ANTENNA ARRANGEMENT

| MODULATION | QPSK-OFDM |
|---|---|
| SUB-CARRIER | 52 |
| ANTENNA | TRIANGLE+1 |
| NUMBER OF WAVES | 4 |
| DIRECTION | 20,80,150,-100(°) |
| DELAY | 0,50,100,1100(ns) |
| POWER | DESIRED:0dB<br>DELAYED WAVE INSIDE GUARD:-3dB<br>DELAYED WAVE OUTSIDE GUARD:-6dB |
| NOISE | NONE |
| PHASING | NONE |
| DOPPLER | 0(Hz) |

ADAPTIVE RECEIVER HAVING ADAPTIVE ARRAY UNIT AND EQUALIZER UNIT

CROSS REFERENCE TO RELATED APPLICATION

This application is based on and incorporates herein by reference Japanese Patent Application No. 2000-333292 filed on Oct. 31, 2000.

BACKGROUND OF THE INVENTION

1. Field of the Invention

The present invention relates to an adaptive receiver used in multi-carrier transmission systems for transmitting data in parallel through frequency division.

2. Description of Related Art

In recent years, attention is paid to an OFDM (Orthogonal Frequency Division Multiplexing) system for transmitting data in parallel through frequency division as a modulation system used for broad band communication using radio wave. According to this OFDM system, data can be transmitted using a longer period, and therefore influence of frequency selective fading is reduced. Moreover, in this OFDM system, inter-symbol interference can be prevented even if a delayed radio wave is received by adding a copy signal of the own symbol called as a guard interval.

Even when this OFDM system is used, the feature is lessened to a large extent because the orthogonal property is lessened in the environment where a long-delayed signal which appears after a long period of delay is received after a plurality times of reflection at walls or in the case where the preceding signal wave exists because of synchronization with the delayed wave. The orthogonal property is lessened as shown in FIG. 18A to FIG. 18C.

In FIG. 18A, the delayed wave is within a guard interval. In this case, the orthogonal property is never destroyed because a part (indicated as A in the figure) generating interference with other symbol is cut off with elimination of the guard interval at the time of demodulation. In FIG. 18B, a signal wave exceeding the guard interval appears. In this case, since the part generating interference with the other symbol enters a FFT window, the orthogonal property of carrier is destroyed at the time of demodulation. In FIG. 18C, synchronization is set up with the delayed signal wave. Similarly to the case of FIG. 18B, since the part generating interference with the other symbol enters the FFT window, the orthogonal property of carrier is destroyed at the time of demodulation.

An adaptive array antenna is proposed to effectively control an unwanted signal wave (such as delayed wave exceeding the guard interval, preceding wave or interference wave) having a lower correlation to such a desired signal wave. Here, the adaptive array antenna is a device comprising an array antenna made up of a plurality of antenna elements and an adaptive arithmetic unit for calculating a complex weight for changing amplitude and phase of an output signal of each antenna element in view of combining the signal waves by multiplying the receiving signals of antenna with a complex weight to extract the desired signal wave and suppress the unwanted wave.

Moreover, the arithmetic operation by the adaptive arithmetic unit is called as an adaptive algorithm, several algorithms have been reported. For example, algorithms LMS (Least Means Square) and CMA (Constant Modulus Algorithm) can be listed as those based on an MMSE (Minimum Mean Square Error). The LMS is the algorithm for calculating the optimum complex weight by minimizing a difference between a reference signal as a desired array response and an actual array output signal. Moreover, the CMA is the algorithm that can be applied to a constant envelope signal to calculate an optimum complex weight to recover a signal distorted in a multipath environment to an original constant envelope signal. Moreover, the additional algorithms are MSN (Maximum Signal to Noise Ratio) for calculating the complex weight to obtain a maximum SNR (Signal to Noise Ratio) of array output and DCMP (Directionally Constrained Minimization of Power) for minimizing the power under the precondition that the incoming direction of the desired signal wave is known.

Moreover, JP-A-10-93323 (U.S. Pat. No. 6,087,986) teaches an adaptive antenna and multi-carrier radio communication system. This system conducts an adaptive arithmetic operation based on LMS, RLS (Recursive Least Squares) algorithm for extracting the known signal called as pilot data inserted into the receiving signal and then updating the complex weight to minimize an error from the known signal prepared in the receiver side. JP-A-10-210099 also teaches an adaptive receiver which realizes CMA in a frequency range for updating the complex weight to make constant the spectrum after the adaptive combining.

The unwanted wave having lower correlation can be controlled effectively by utilizing the above adaptive array antenna. However, the unwanted wave (delayed signal wave within the guard interval) having higher correlation cannot be controlled effectively and thereby the demodulation characteristic is not satisfactory. This is because, a propagation path in the adaptive array antenna is estimated by comparing two reference signals, one resulting after combining the receiving signal weighted by the adaptive array antenna and the other being a stored known signal, and hence the weighting by the adaptive array antenna influences on the propagation path estimation value.

SUMMARY OF THE INVENTION

It is therefore an object of the present invention to provide an adaptive receiver which can effectively control not only an unwanted signal wave of lower correlation but also an unwanted signal wave of higher correlation.

It is another object of the present invention to remove influence of weighting in an adaptive array antenna on estimation of a propagation path estimation value.

According to the present invention, an adaptive receiver includes an adaptive array unit and an equalizer unit. In the adaptive array unit, receiving signals of an array antenna are weighted by multiplying with a complex weight calculated by an adaptive arithmetic unit, and adaptively combined. In the equalizer unit, propagation path estimation values are calculated from the receiving signals by a propagation path estimating unit, weighted with the complex weight by a complex weight adjusting unit, and adaptively combined. An output signal of the adaptive receiver is produced based on the combined signal and the combined propagation path estimation value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
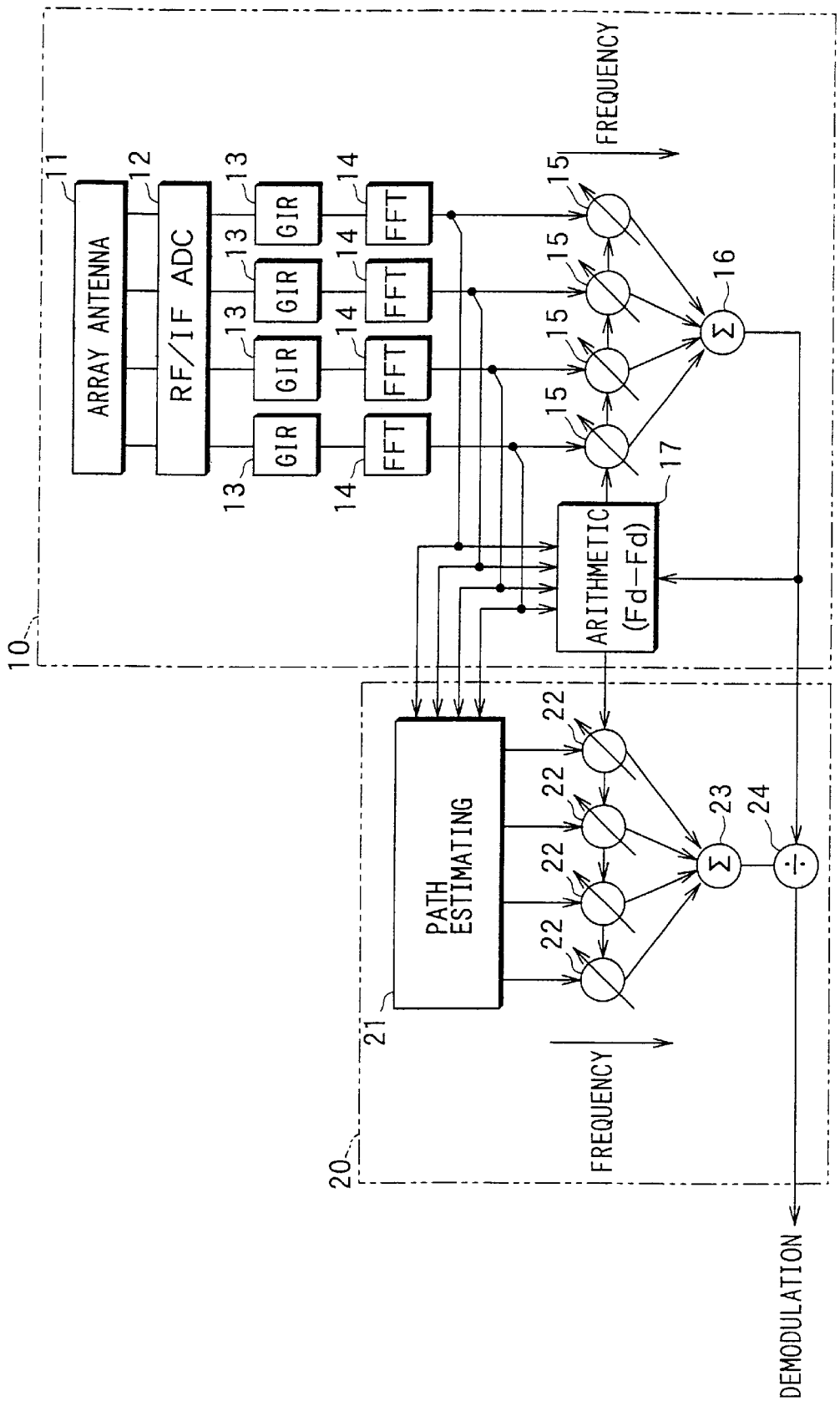
FIG. 1 illustrates an adaptive receiver according to a first embodiment of the present invention.

Referring first to FIG. 1, an adaptive receiver includes an adaptive array unit 10 and an equalizing unit 20. The adaptive array unit 10 is composed of an array antenna (made up of four antenna elements) 11, an RF/IF circuit and an AD converter (RF/IF ADC) 12, a guard interval removing unit (GIR) 13, an high speed Fourier transforming unit (FFT) 14, a complex weight adjusting unit 15, an adder unit 16 and an adaptive arithmetic unit 17.

Figure 2:
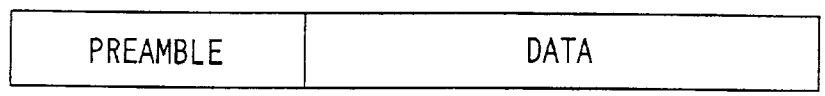
FIG. 2 illustrates a signal format used in the first embodiment.

Signals processed in this embodiment is formatted as shown in FIG. 2. That is, the signal includes a preamble which is known. As regards this signal format, IEEE802.11a (radio LAN specification, packet communication), for example, is used. The known data of this preamble is used for timing detection, auto gain control (AGC), auto frequency control (AFC) and propagation path estimation.

OFDM signal transmitted from a transmitter (not shown) is received by the array antenna 11 made up of a plurality of antenna elements via a multipath signal wave propagation environment. The signal received by the array antenna 11 is sampled by the RF/IF ADC 12 into a digital baseband signal. This baseband signal is OFDM-demodulated by the GI removing unit 13 and FFT 14. The OFDM demodulation signal is then inputted to the complex weight adjusting unit 15 and the adaptive arithmetic unit 17.

In the complex weight adjusting unit 15, the OFDM demodulation signals from the FFT 14 are multiplied with a signal (complex weight) from the adaptive arithmetic unit 17 for the weighting, respectively. By this weighting process, the phase and amplitude of the OFDM demodulation signal are adjusted. The weighted OFDM demodulation signals are combined in the adder unit 16 and are then outputted as output signals (demodulation signals after the adaptive combination) of the adaptive array unit 10. The demodulation signals after this adaptive combination are fed back to the adaptive arithmetic unit 17.

In the adaptive arithmetic unit 17, the complex weight is updated using the OFDM demodulation signals of four systems from the FFT 14 and the feedback signal from the adder unit 16. In this adaptive arithmetic unit 17, MMSE, CMA, MSN and DCMP or the like are used as an adaptive algorithm.

The equalizing unit 20 is composed of a propagation path estimating unit 21, a complex weight adjusting unit 22, an adder unit 23 and a divider unit 24.

The propagation path estimating unit 21 divides the known signal of the preamble provided in the OFDM demodulation signal by the known signal previously stored in the receiver side based on the respective OFDM demodulation signals from the FFT 14 to calculate a propagation path estimating value. For the ordinary equalization of the OFDM signal, a method has been proposed whereby the inverse characteristic of the propagation path is estimated by dividing the known signal stored in the receiver side by the received known signal and the receiving data is multiplied with such an inverse characteristic. In addition to the method for equalization, by dividing the received known signal by the known signal stored in the receiver side to estimate the propagation path and then dividing the receiving data by such a propagation path.

In this embodiment, however, the inverse characteristic of the propagation path cannot be used because the adaptive combination is performed, as will be explained later. Therefore, in this embodiment, the propagation path estimation value is calculated by dividing the known signals received by each antenna by the known signal stored in the receiver side, respectively.

This calculated propagation path estimation value is stored in a memory within the propagation path estimating unit 21 and is then outputted to the complex weight adjusting unit 22. The propagation path estimation value stored in the memory is updated whenever the propagation path estimation value is newly calculated.

The complex weight adjusting unit 22 executes the weighting by multiplying the propagation path estimation value from the propagation path estimating unit 21 with the signal from the adaptive arithmetic unit 17. In this case, the propagation path estimation values from the propagation path estimation unit 21 are multiplied with a complex weight the same as that used for the weighting process in the complex weight adjusting unit 22. The weighted propagation path estimation values are added in the adder unit 23 to attain the propagation path estimation value after the adaptive combining process.

The demodulation signal after the adaptive combination outputted from the adaptive array unit 10 is divided, in the divider unit 24, by the propagation path estimation value after the adaptive combining process. It is then outputted to a demodulation unit (not illustrated) of the latter stage as the demodulation signal equalized with the adaptive array unit 10 and equalizer 20.

FIGS. 3A to 3D illustrate the converging characteristic and constellation results when a simulation is executed. FIG. 4A illustrates layout of the antenna used for the simulation, while FIG. 4B illustrates the simulation condition. Moreover, the signal format conforms to IEEE802.11a.

Figure 3A:
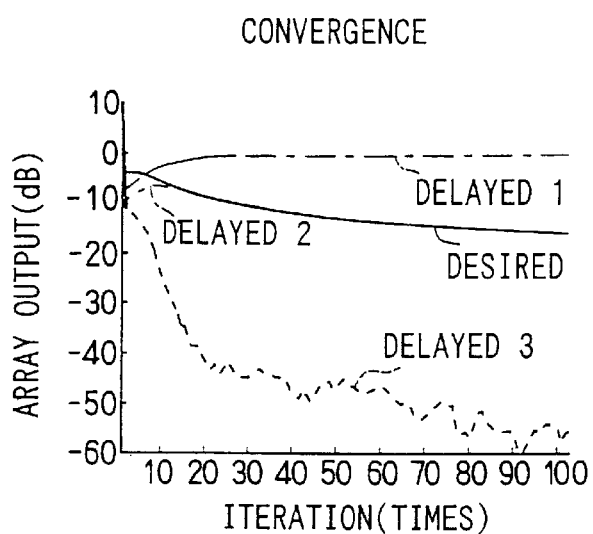
FIGS. 3A to 3D illustrate converging characteristic and constellation results when a simulation is executed in the first embodiment.
Figure 3B:
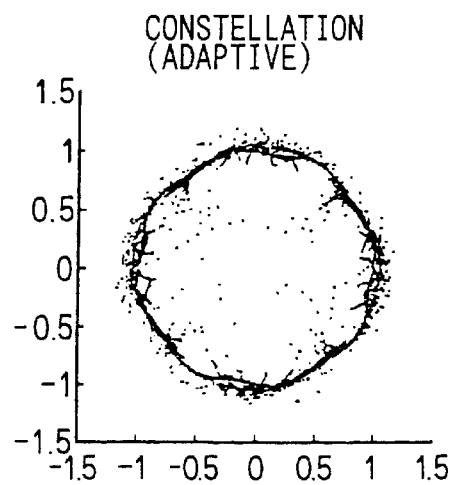
Figure 3C:
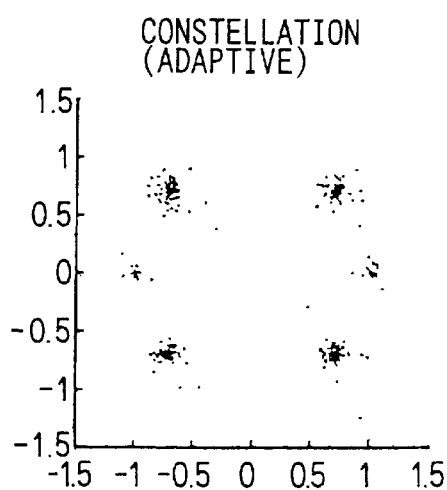
Figure 3D:
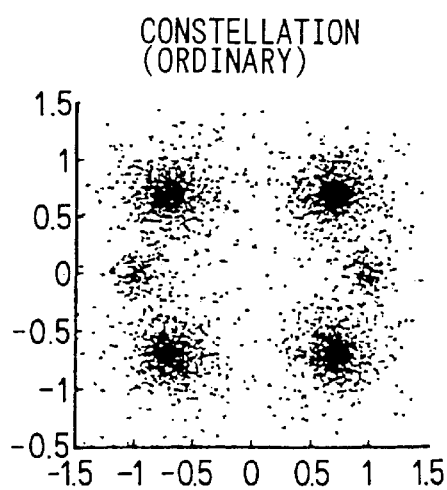
Figures 4A, 4B:
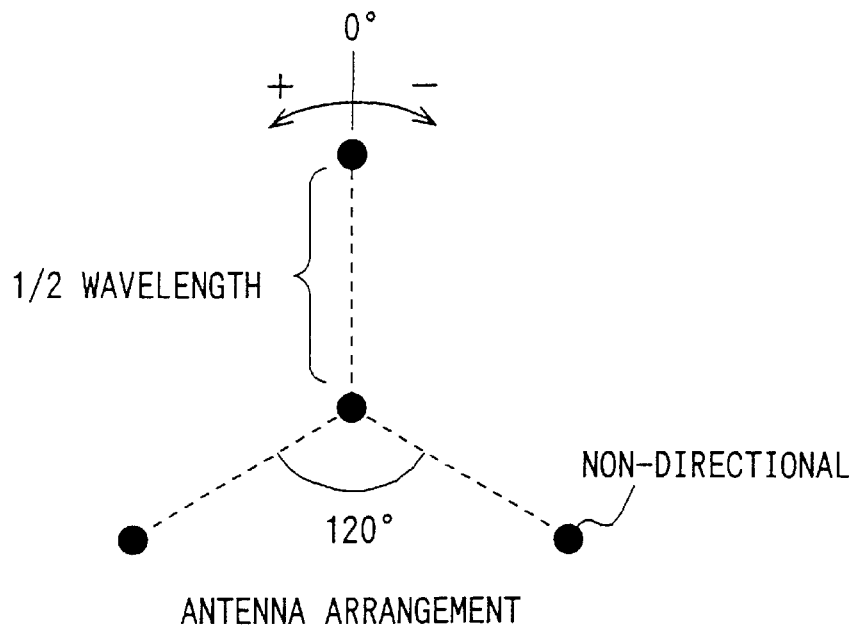
FIGS. 4A and 4B illustrate allocation of antennas and simulation conditions used in the simulation of FIG. 3.

From FIG. 3A, it can be confirmed that the adaptive array unit 10 can certainly control a signal wave (delayed wave 3) on the outside of the guard interval with lower correlation but results in a lower control effect for signal waves (delayed waves 1, 2) within the guard interval. Here, the guard interval length is set to 800 ns. Moreover, a complementary signal wave is not a synchronized desired wave but the delayed wave 1. As a result, the constellation circulates on the concentric circles and therefore, synchronous detection is impossible. However, a smooth demodulation characteristic can be obtained as illustrated in FIG. 3C by combining the adaptive array unit 10 and equalizer 20. FIG. 3D illustrates the demodulation characteristic when the signal is received by only one antenna and ordinary equalization is executed. From a comparison of these demodulation characteristics, it is understood that a more excellent equalizing capability can be attained through a structure combining the adaptive array unit 10 and equalizer 20 as in the case of this embodiment.

Moreover, this embodiment is also superior from the point that the propagation path estimation value is calculated at the timing of using the desired signal wave but it is conducted as if the propagation path estimation value were obtained at the timing of the delayed signal wave because the propagation path estimation values are combined adaptively. Where the CMA is used as the adaptive algorithm, the erroneous complement of the signal results in a problem but it can be avoided in this embodiment.

Second Embodiment

Figure 5:
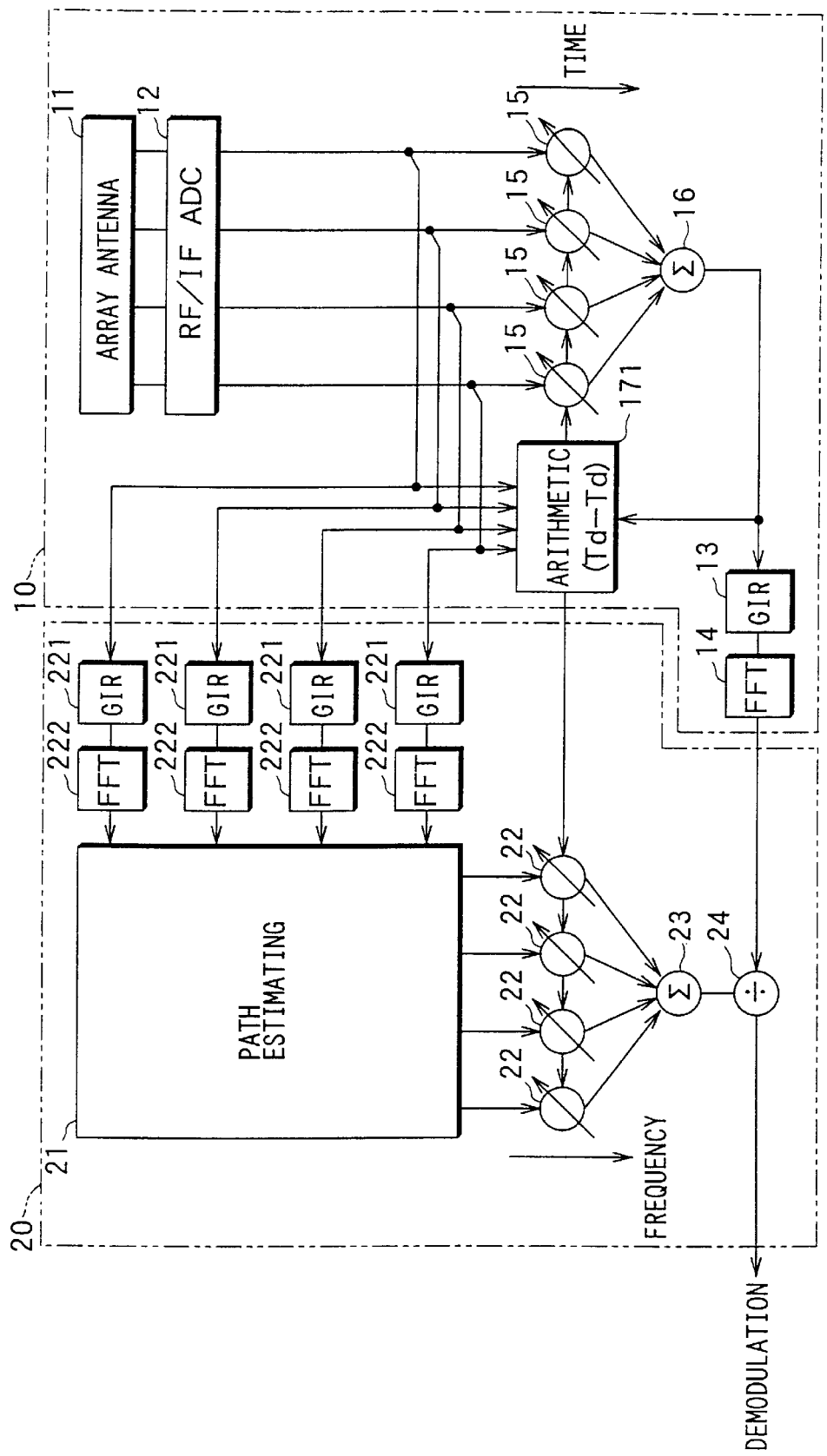
FIG. 5 illustrates an adaptive receiver according to a second embodiment of the present invention.

In a second embodiment illustrated in FIG. 5, an adaptive arithmetic unit 171 is constructed to execute the adaptive arithmetic operation on the signal before OFDM demodulation.

The signal (signal in the time domain or region) from RF/IF ADC 12 is inputted to the adaptive arithmetic unit 171. In this adaptive arithmetic unit 171, MMSE is used as the adaptive algorithm to prepare a reference signal in the time domain of the preamble signal and calculate the complex weight to minimize any errors for the received signal in the time domain. The signals in the time domain from the RF/IF ADC 12 are weighted with the signal from the adaptive arithmetic unit 171 in the complex weight adjusting unit 15 and moreover, are then added in the adder unit 16. The signal in the time domain after the adaptive combining is inputted to the adaptive arithmetic unit 171 and is demodulated by the OFDM demodulation method with the GI removing unit 13 and FFT 14.

In the equalizer 20, the signal in the time domain from the RF/IF ADC 12 is demodulated by the OFDM demodulation method in GI removing unit 221 and an FFT 222 and is then inputted to the propagation path estimating unit 21. Thereafter, as in the first embodiment, the propagation path estimation value is calculated in the propagation path estimating unit 21, the propagation path estimation value is weighted in the complex weight adjusting unit 22 and these propagation path estimation values are combined in the adder unit 23 to provide the propagation path estimation value after the adaptive combining.

The demodulation signal after the adaptive combining outputted from the adaptive array unit 10 is divided, in the dividing unit 24, by the propagation path estimation value after the adaptive combining. It is then outputted to the demodulation unit (not shown) as the demodulation signal equalized by the adaptive array unit 10 and equalizer 20.

Third Embodiment

Figure 6:
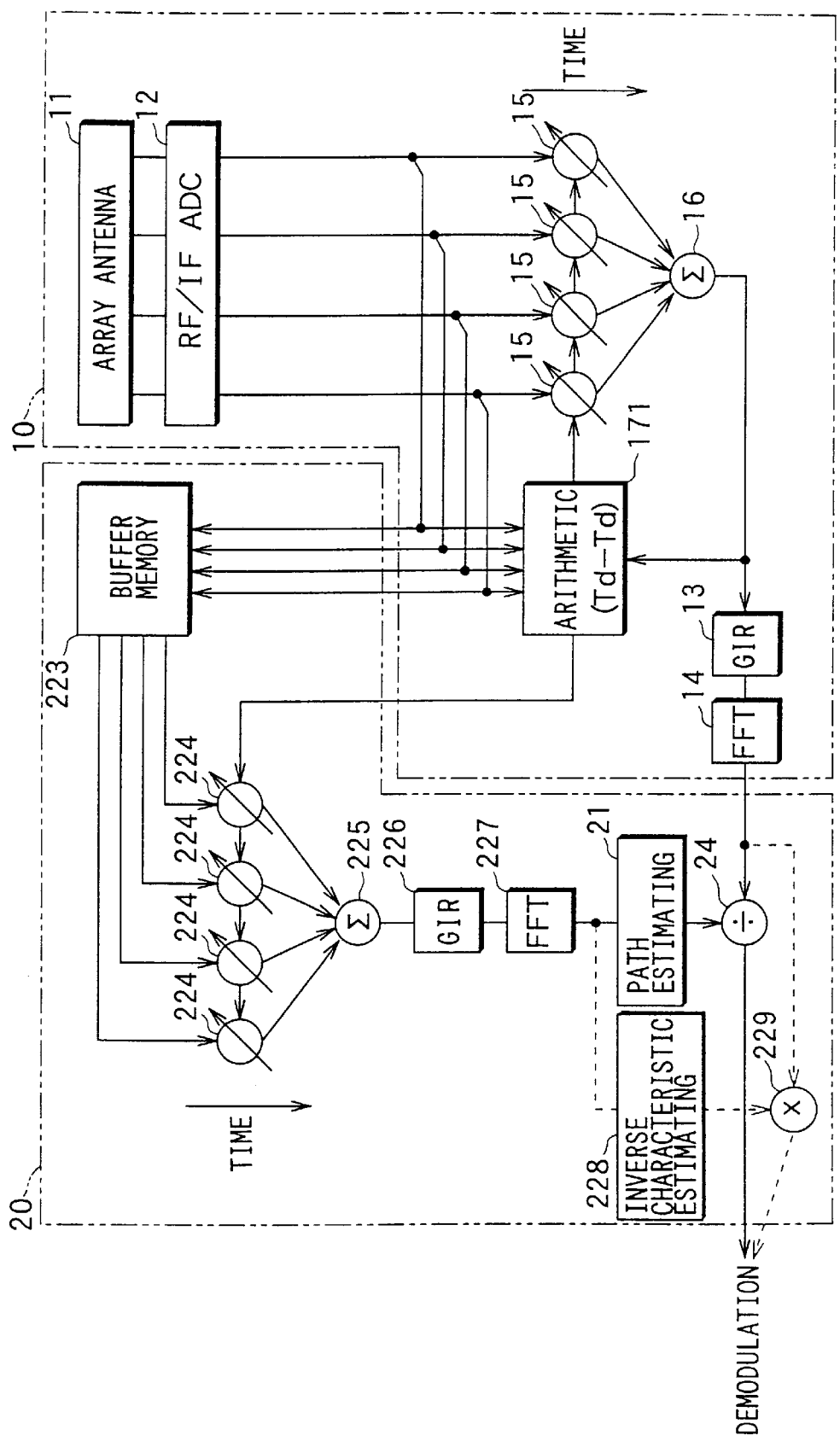
FIG. 6 illustrates an adaptive receiver according to a third embodiment of the present invention.

In a third embodiment illustrated in FIG. 6, the equalizer 20 in the second embodiment is modified.

The equalizer 20 is composed of a buffer memory 223, a complex weight adjusting unit 224, an adder unit 225, a GI removing unit 226, an FFT 227, a propagation path estimating unit 21 and a divider unit 24.

The preamble signal among the signals in the time domain outputted from the RF/IF ADC 12 is stored in the buffer memory 223. That is, the known signal before demodulation is extracted and stored in this buffer memory 223. The signal stored in the buffer memory 223 is weighted with the signal from the adaptive arithmetic unit 171 in the complex weight adjusting unit 224, added in the adder unit 225 and is then demodulated by the OFDM modulation method with the GI removing unit 226 and FFT 227. The propagation path estimation value is calculated in the propagation path estimating unit 21 with the signal outputted from this FFT 227.

As in the case of the second embodiment, the demodulation signal after the adaptive combining outputted from the adaptive array unit 10 is divided by the propagation path estimation value in the divider unit 24. It is then outputted to the demodulation unit in the latter stage as the demodulation signal equalized with the adaptive array unit 10 and equalizer 20.

In this embodiment, since the signal outputted from the FFT 227 is attained after the adaptive combining, a propagation path inverse characteristic estimating unit 228 and a multiplier unit 229 may be substituted for the propagation path estimating unit 21 and divider unit 24. In this case, in the propagation path inverse characteristic estimating unit 228, the known signal stored in the receiver side is divided by the received known signal to estimate the inverse characteristic of the propagation path. The equalization can be realized by multiplying the demodulation signal after the adaptive combining with such an estimation value in the multiplier unit 229.

Fourth Embodiment

Figure 7:
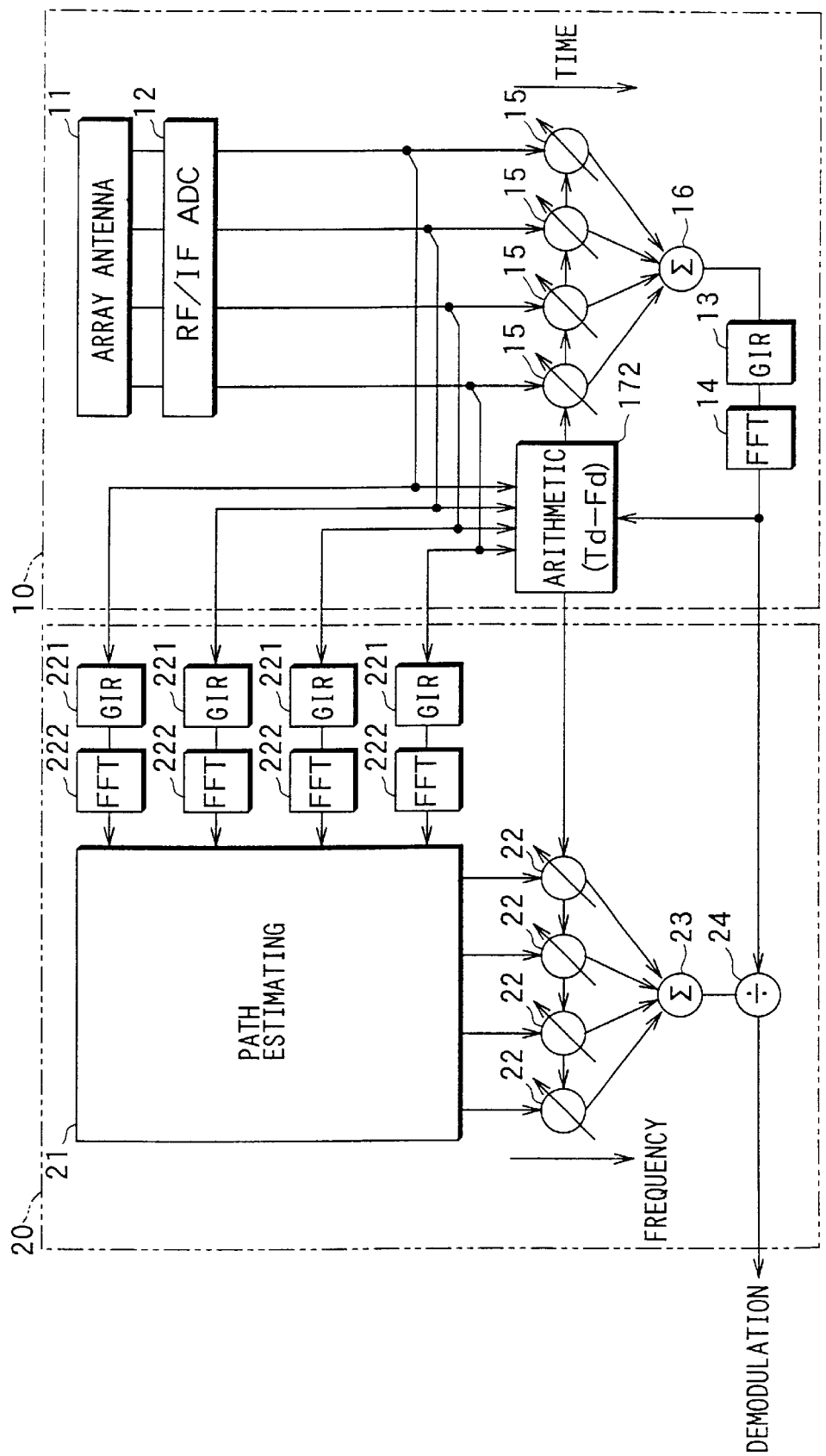
FIG. 7 illustrates an adaptive receiver according to a fourth embodiment of the present invention.
Figure 8:
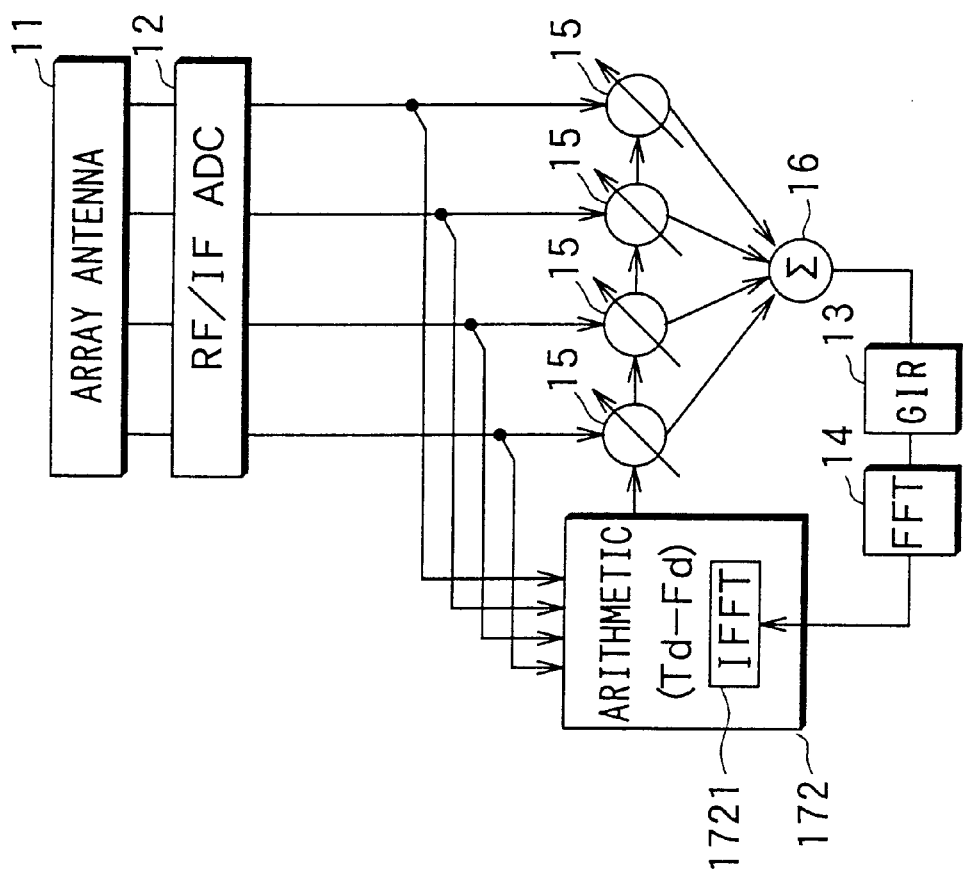
FIG. 8 illustrates an adaptive arithmetic unit in the fourth embodiment.

In a fourth embodiment illustrated in FIGS. 7 and 8, the adaptive arithmetic unit 172 executes the adaptive arithmetic operation between the signal in the time domain from the RF/IF ADC 12 and the signal on the frequency axis demodulated with the OFDM demodulation method by the GI removing unit 13 and FFT 14.

In this case, the adaptive arithmetic unit 172 cannot realize the adaptive arithmetic operation using the existing algorithm because one input is the signal on the time axis, while the other input is the signal on the frequency axis. Therefore, it is requested here that both signals are set as either a signal on the time axis or a signal on the frequency axis. For this purpose, an IFFT (inverse high speed Fourier transforming unit) 1721 (FIG. 8) is provided in the adaptive arithmetic unit 172. The correlation vector calculated from the signal on the frequency axis demodulated by the OFDM demodulation method from the FFT 14 is converted to the signal on the time axis and the adaptive arithmetic operation is executed with the algorithm, as in the case of the second embodiment using such a converted signal.

Figure 9:
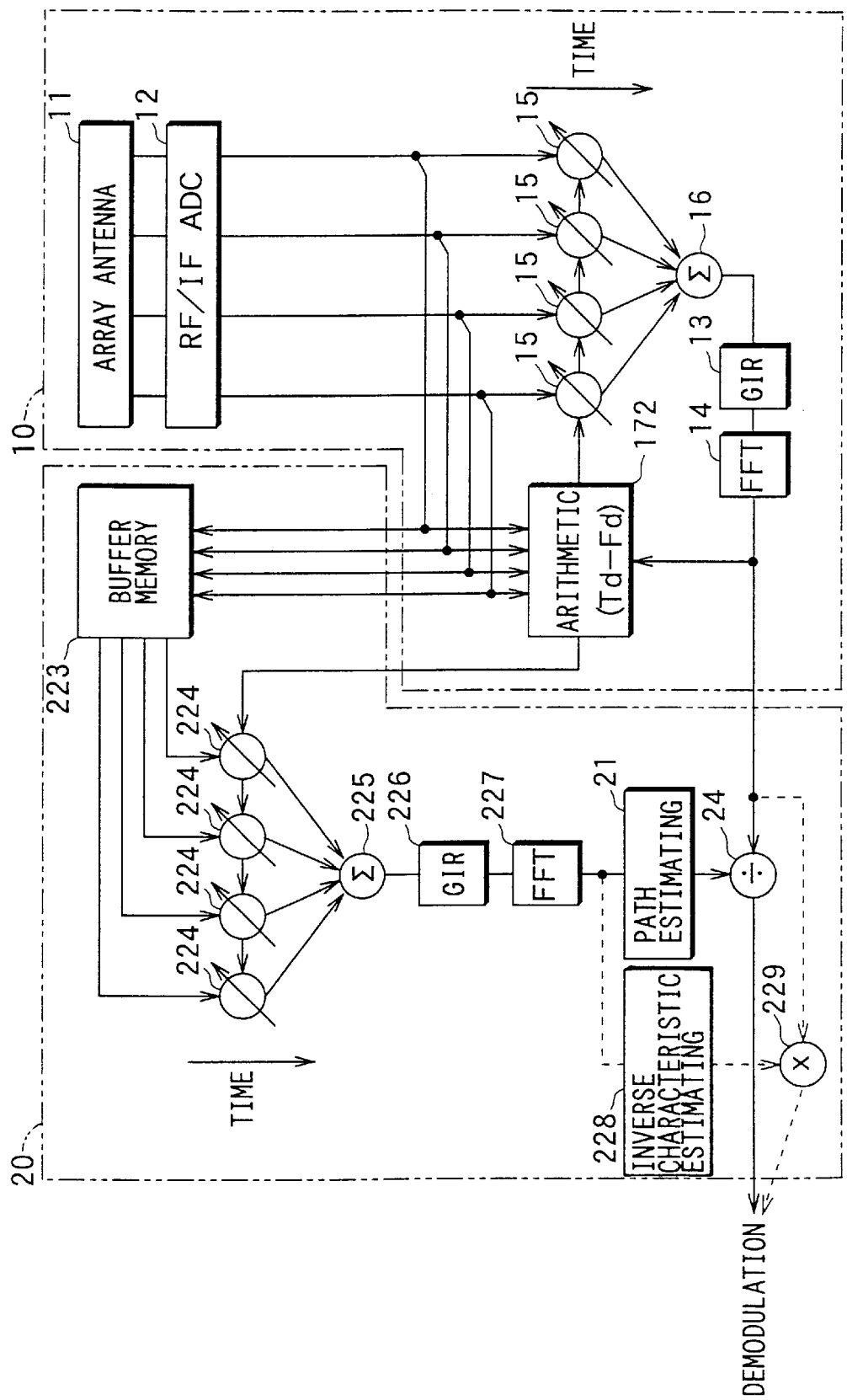
FIG. 9 illustrates a modification of the fourth embodiment.

Here, it is also possible to introduce the structure illustrated in FIG. 9 by adapting the adaptive arithmetic unit of this embodiment to the third embodiment.

Fifth Embodiment

Figure 10:
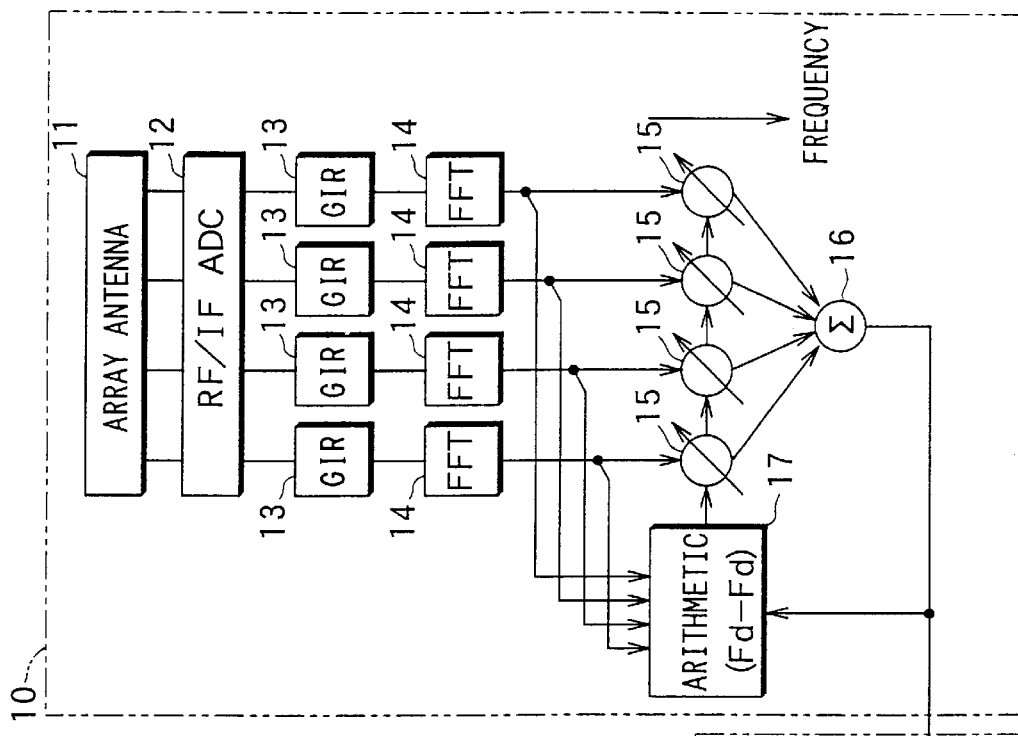
FIG. 10 illustrates an adaptive receiver according to a fifth embodiment of the present invention.
Figure 11:
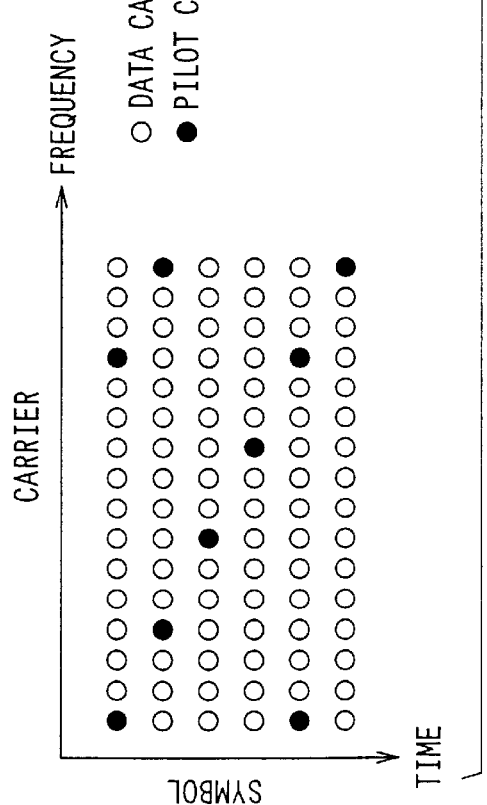
FIG. 11 illustrates an arrangement of symbol (time axis) and a carrier (frequency) of a SP system used in the fifth embodiment.

In a fifth embodiment illustrated in FIG. 10, SP system signal format using a scattered pilot (SP), of which the propagation path estimation value is updated with the passage of time, is used as the signal format. FIG. 11 illustrates the allocation of the symbol (time axis) and carrier (frequency) in this PS system. The pilot carrier (known signal) is allocated in adequate positions within a four-symbol unit. In the case of this SP system, the preamble is not allocated in the heading position of a packet, the equalizer 20 used in the first to fourth embodiments cannot be used.

Figure 12:
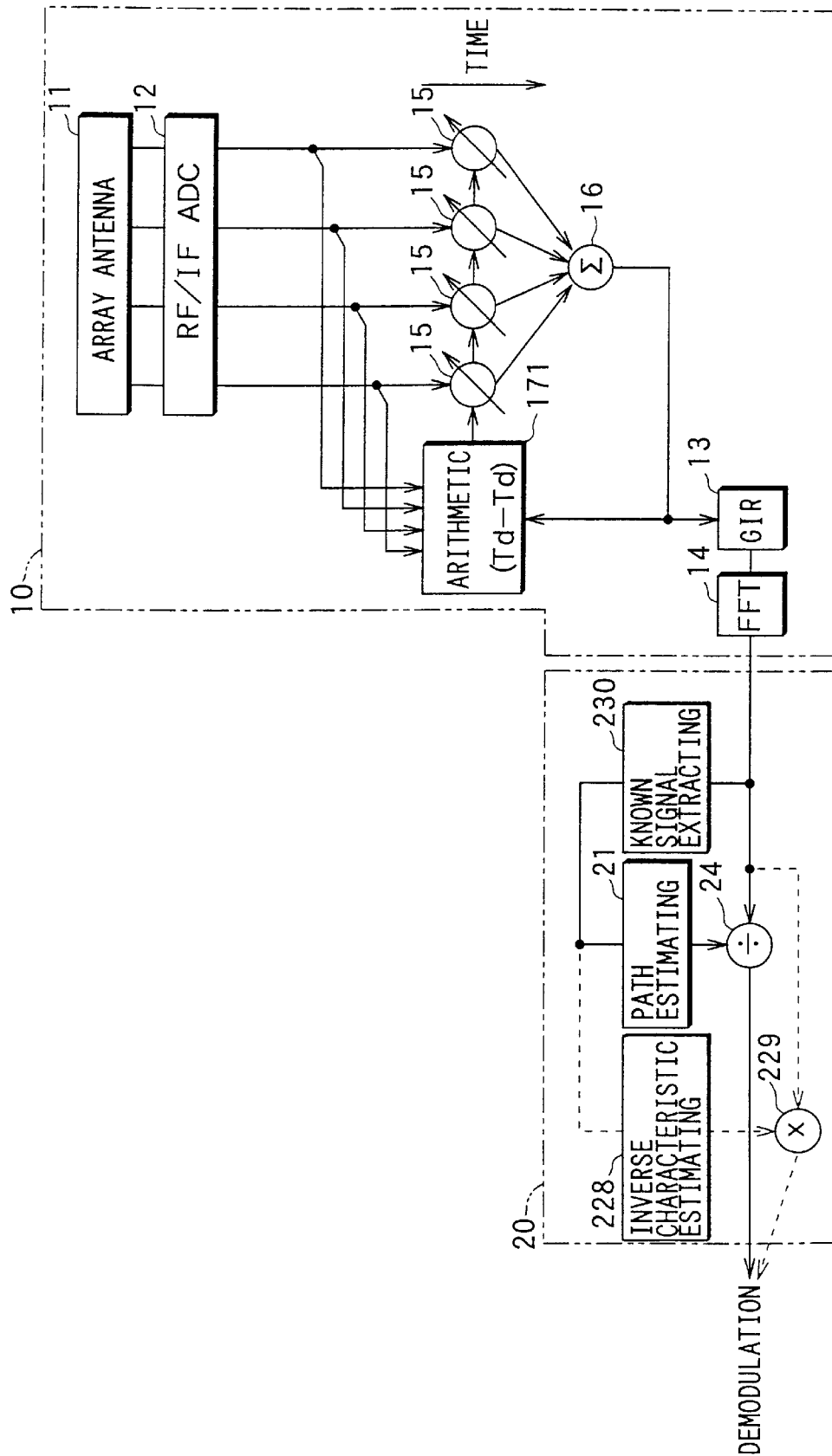
FIG. 12 illustrates a modification of the fifth embodiment.
Figure 13:
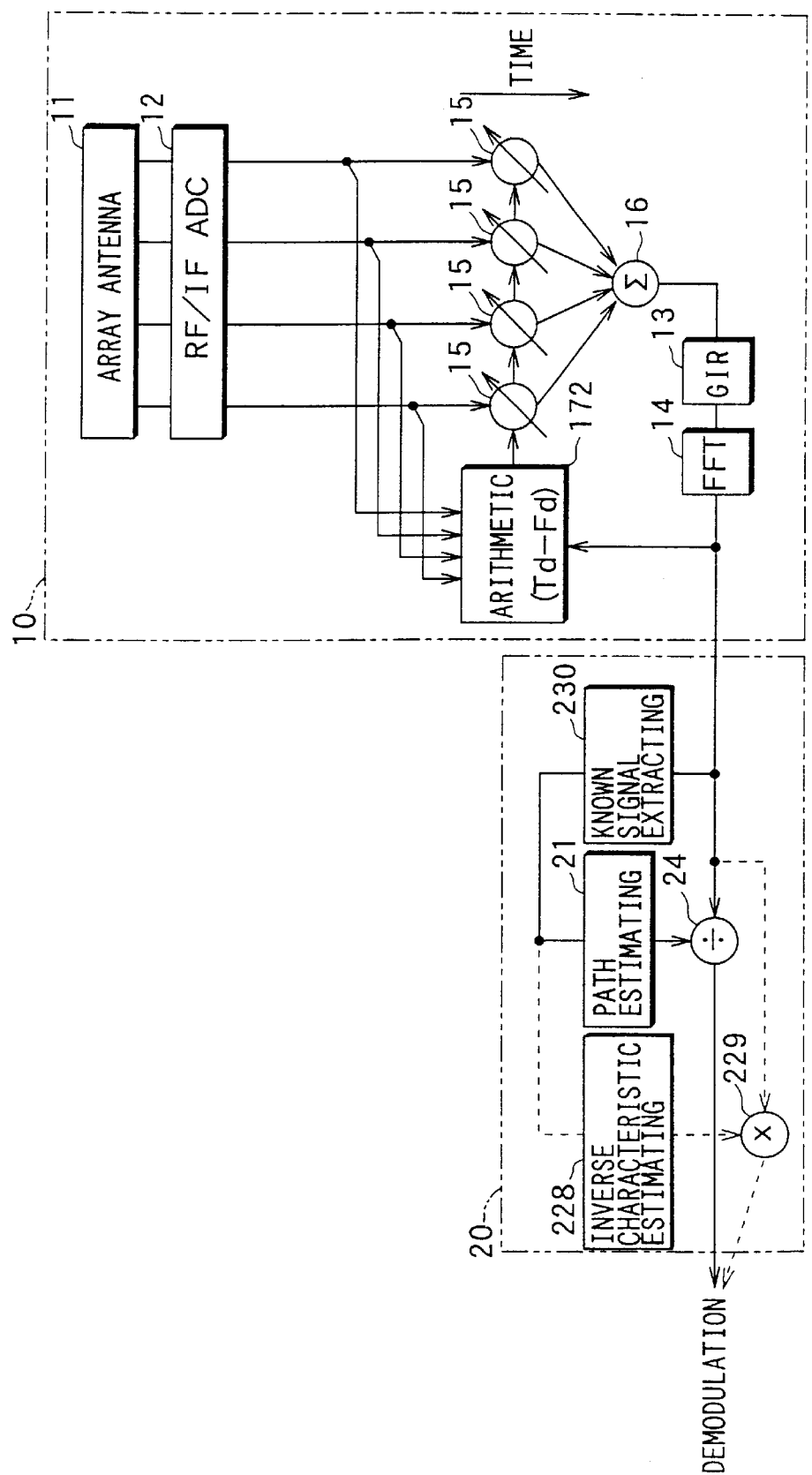
FIG. 13 illustrates a modification of the fifth embodiment.

Therefore, the equalizer 20 in this embodiment is composed, as illustrated in FIG. 10, of a known signal extracting unit 230, the propagation path estimating unit 21 and the divider unit 24. Moreover, it is also possible that the adaptive array unit 10 can introduce a structure similar to that in the second to fourth embodiments in addition to that of the first embodiment, as illustrated in FIG. 12 and FIG. 13.

In the structure in FIG. 10, the known signal extracting unit 230 extracts the known signal inserted into the demodulation signal after the adaptive combining outputted from the adaptive array unit 10 in the unit with a predetermined number of symbols (four symbols, for example). The propagation path estimating unit 21 divides the known signal extracted by the known signal extracting unit 230 with the known signal previously stored in the receiver side to calculate the propagation path estimation value. This calculated propagation path estimation value is stored in the memory within the propagation path estimating unit 21 and is then updated in the four-symbol unit.

Next, the demodulation signal after the adaptive combining outputted from the adaptive array unit 10 is divided by the propagation path estimation value in the divider unit 24 and is then outputted to the demodulation unit in the latter stage as the data equalized with the adaptive array unit 10 and equalizer 20.

Since the signal outputted from the adaptive array unit 10 is the signal after the adaptive combining even in this embodiment, it is also possible that the propagation path inverse characteristic estimating unit 228 and the multiplier unit 229 are substituted for the propagation path estimating unit 21 and divider unit 24.

Figure 14:
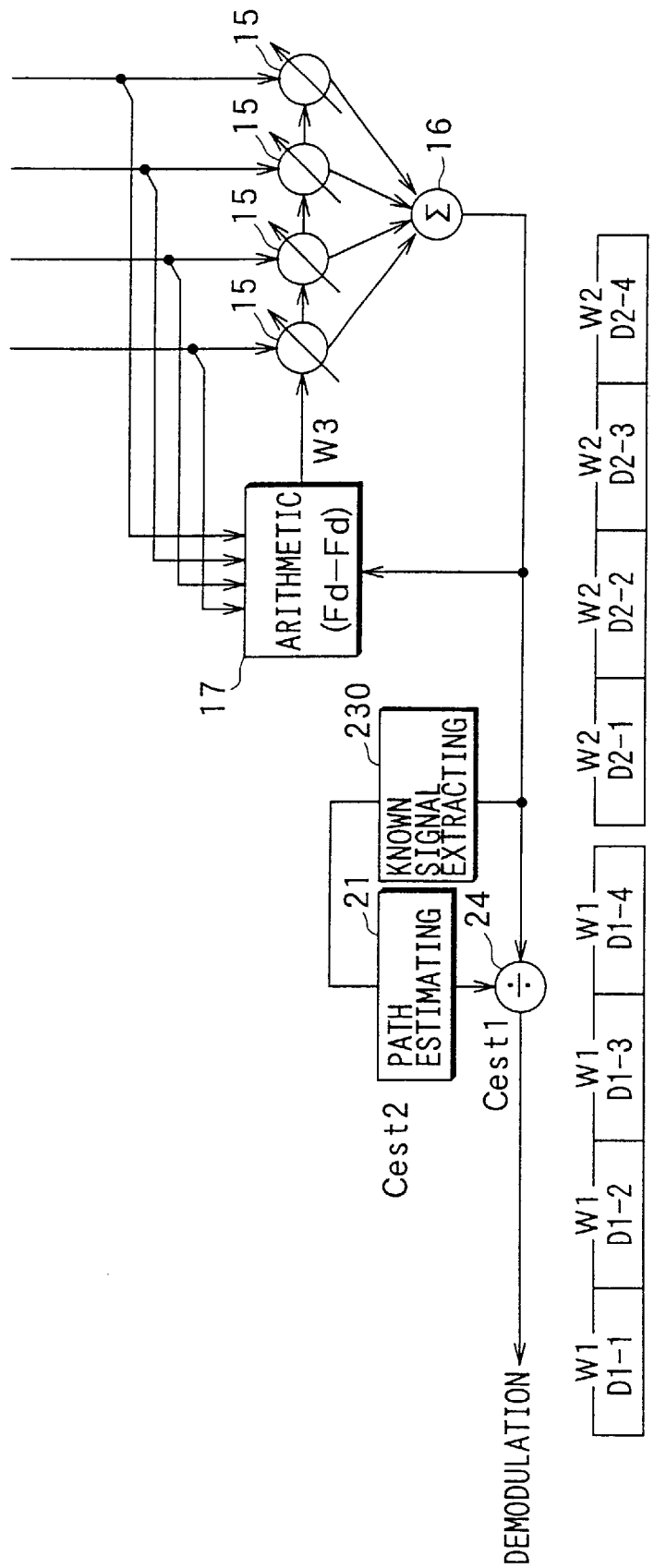
FIG. 14 illustrates a modification of the fifth embodiment.

In this embodiment, it is of course possible that the adaptive arithmetic unit 17 updates the complex width for every symbol as in the case of the first embodiment. However, since the propagation path estimating unit 21 updates the propagation path estimation value in the unit with a predetermined number of symbols (four symbols, for example), it is preferable that the adaptive arithmetic unit 17 does not update the complex weight during the period of the predetermined number of symbols. This example will be explained by reference to FIG. 14.

The adaptive arithmetic unit 17 updates the complex weight in the four-symbol unit. Here, it is assumed that the adder unit 16 outputs the four-symbol data (D) 2-1, 2-2, 2-3 and 2-4 using the complex weight W2. After this output, the adaptive arithmetic unit 17 outputs the next complex weight W3. The known signal extracting unit 230 extracts the known signal from the four-symbol data 2-1, 2-2, 2-3 and 2-4. At this timing, since the propagation path estimating unit 21 outputs the propagation path estimation value Cest1 calculated based on the known signal extracted before the four symbols, the four-symbol data 2-1, 2-2, 2-3 and 2-4 are equalized with the propagation path estimation value Cest1.

Figure 15:
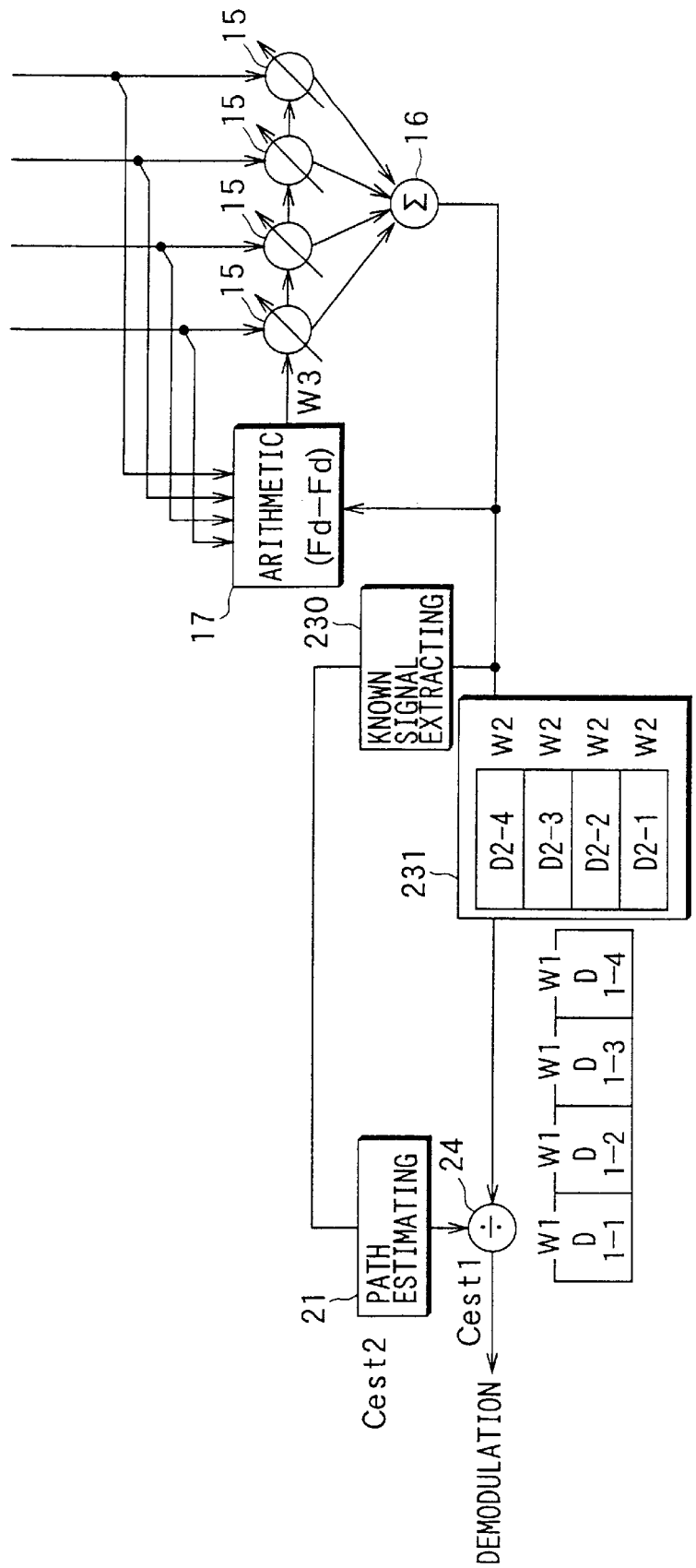
FIG. 15 illustrates a modification of the fifth embodiment.

Moreover, in this case, the signal outputted from the propagation path estimating unit 21 is delayed by as much as the time of the four symbols from the demodulation signal after the adaptive combining outputted from the adder unit 16. In order to eliminate such a time delay, it is sufficient to delay the data to be equalized by as much as the four symbols using a delaying unit, such as the buffer. For example, as illustrated in FIG. 15, a buffer 231 is provided before the divider unit 24. Thereby, the four-symbol data 1-1, 1-2, 1-3 and 1-4 can be equalized with the propagation path estimation value Cest1 calculated based on the known signal extracted from the four-symbol data 1-1, 1-2, 1-3 and 1-4. The Cest2 in the figure indicates the propagation path estimation value calculated based on the known signal extracted from the four-symbol data 2-1, 2-2, 2-3 and 2-4.

Figure 16:
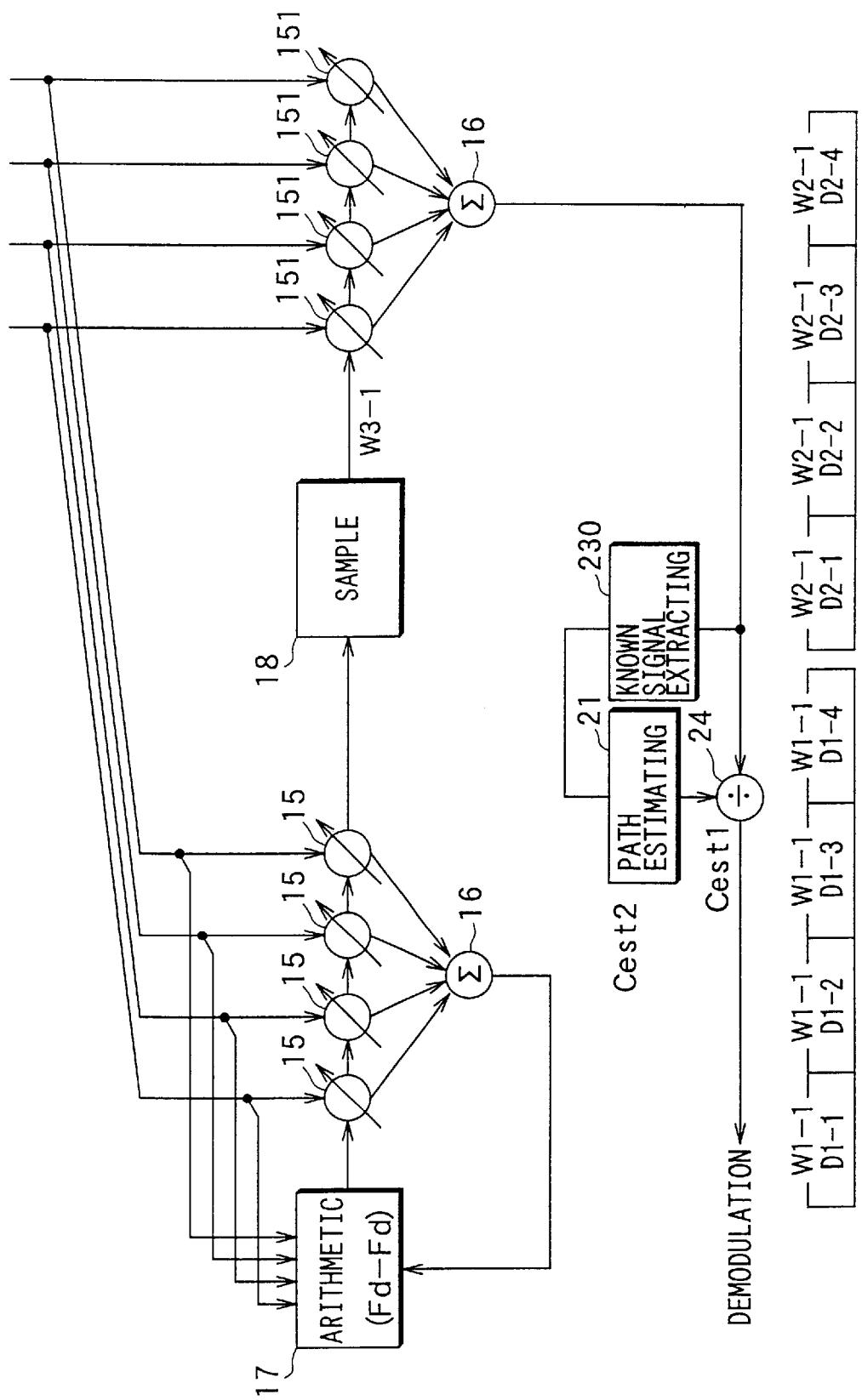
FIG. 16 illustrates a modification of the fifth embodiment.
Figure 17:
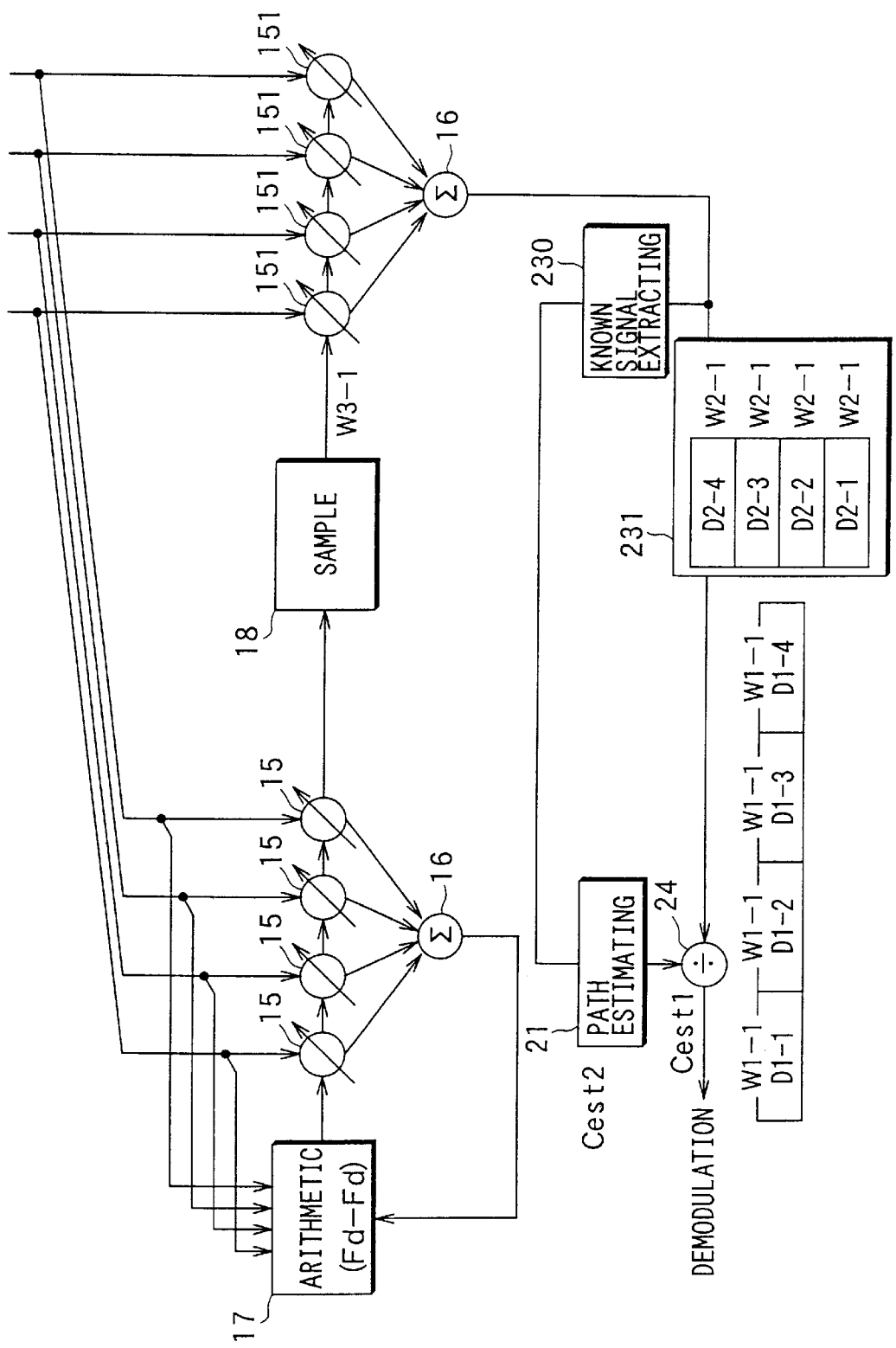
FIG. 17 illustrates a modification of the fifth embodiment.
Figure 18A:
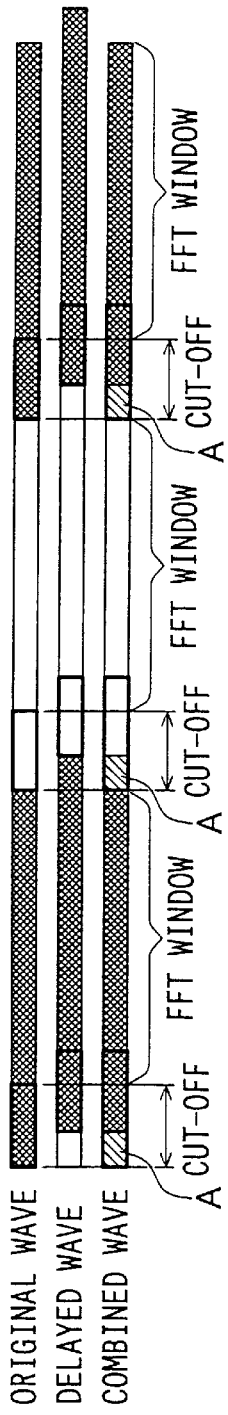
FIGS. 18A–18C illustrate lessening of orthogonal property of a carrier when OFDM system is introduced.
Figure 18B:
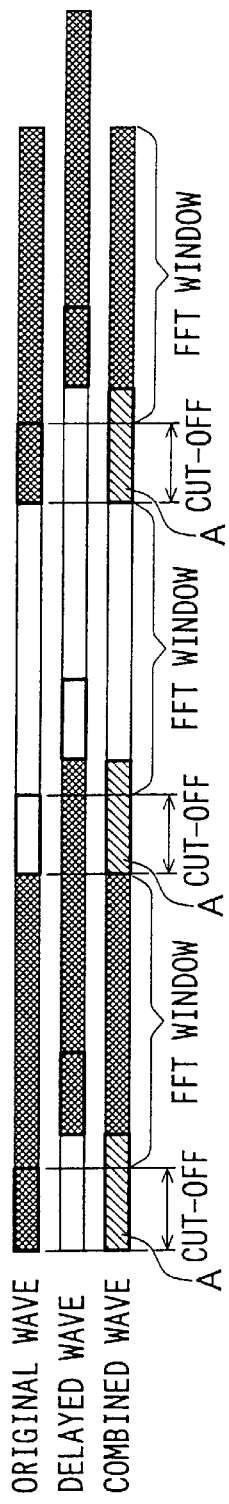
Figure 18C:
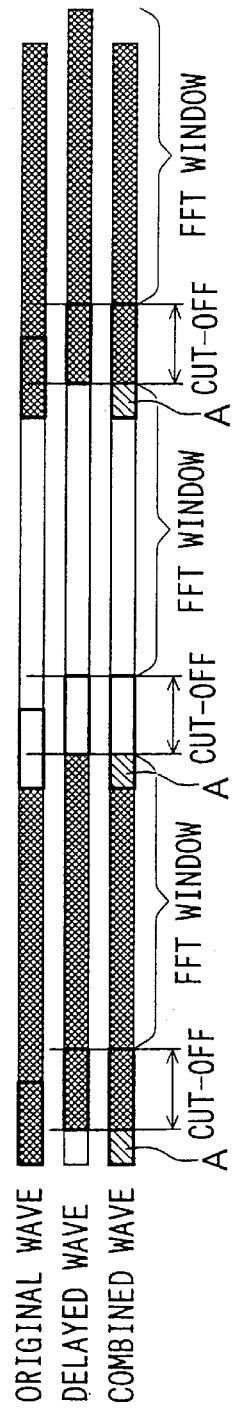

Moreover, this embodiment may be modified as illustrated in FIG. 16. In this case, the adaptive arithmetic unit 17, complex weight adjusting unit 15 and adder unit 16 execute the adaptive arithmetic operation in the unit of each symbol by a structure similar to that of the first embodiment. Thereafter, the complex weight updated for each symbol by such calculation is held in a sample-hold unit 18 as in the unit with a predetermined number of symbols (four symbols, for example) and the adaptive combining is conducted with a complex weight adjusting unit 151 and an adder unit 161 using the held complex weight. The structure of the equalizer 20 in the subsequent stage may be identical to that illustrated in FIG. 14, or may be formed with the addition of the buffer 231 illustrated in FIG. 15 as illustrated in FIG. 17.

In the embodiments illustrated in FIG. 14 to FIG. 17, it is possible to introduce the structures of the second to fourth embodiments as the structure of the adaptive array unit 10 and moreover, it is also possible to use the propagation path inverse characteristic estimating unit 228 and multiplier unit 229 in place of the propagation path estimating unit 21 and the divider unit 24.

Moreover, the present invention is not only limited to the adaptive receiver utilizing the OFDM transmission system but can also be widely adapted to that utilizing a multi-carrier transmission system.

What is claimed is:

1. An adaptive receiver for a multi-carrier transmission system which transmits in parallel frequency-divided data provided with a known signal at a leading edge of data, comprising:

an adaptive array unit including an array antenna made up of a plurality of antenna elements, demodulating means for demodulating signals of the antenna elements to demodulate multiple carrier signals on a frequency axis to form modulation signals, first combining means for combining the demodulated multiple carrier signals by multiplying the modulation signals on the frequency axis with a complex weight to obtain combined demodulation signal after an adaptive combining, and complex weight calculating means for calculating the complex weight based on the demodulation signals on the frequency axis and the combined demodulation signal after the adaptive combining; and an equalizer unit including propagation path estimating means for estimating propagation path estimation values based on the known signal provided in the modulation signals on the frequency axis, second adaptive combining means for determining a combined propagation path estimation value after an adaptive combining through a combining process executed by multiplying the propagation path estimation values calculated by the propagation path estimating means with the complex weight calculated by the complex weight calculating means, and dividing means for dividing the combined demodulation signal after the adaptive combining by the combined propagation path estimation value after the adaptive combining.

2. An adaptive receiver for a multi-carrier transmission system which transmits in parallel frequency-divided data provided with a known signal at a leading edge of data, comprising:

an adaptive array unit including an array antenna made up of a plurality of antenna elements, converting means for converting receiving signals of the antenna elements to conversion signals on a time axis before demodulation, first combining means for combining the conversion signals by multiplying the conversion signals on the time axis with a complex weight to obtain a combined signal after an adaptive combining, complex weight calculating means for calculating the complex weight based on the conversion signals and the combined signal, and first demodulating means for demodulating the combined signal to a demodulation signal on a frequency axis after the adaptive combining; and an equalizer unit including second demodulating means for demodulating the conversion signals on the time axis to demodulation signals on a frequency axis, transmission path estimating means for estimating propagation path estimation values based on the known signal provided in the demodulation signals, second combining means for determining a combined propagation path estimation value after an adaptive combining through a combining process by multiplying the propagation path estimation values with the complex weight calculated by the complex weight calculating means, and dividing means for dividing the demodulation signal after the adaptive combining by the combined propagation path estimation value after the adaptive combining.

3. An adaptive receiver according to claim 2, wherein:

the complex weight calculating means calculates the complex weight by using the demodulation signal of the first demodulating means after the adaptive combining in place of using the combined signal.

4. An adaptive receiver according to claim 3, wherein:

the complex weight calculating means includes converting means for converting to a signal on the time axis from a correlation vector calculated from the demodulation signal on the frequency axis after the adaptive combining in order to calculate the complex weight based on the signal on the time axis and the conversion signals on the time axis.

5. An adaptive receiver for a multi-carrier transmission system which transmits in parallel frequency-divided data provided with a known signal at a leading edge of data, comprising:

an adaptive array unit including an array antenna made up of a plurality of antenna elements, converting means for converting receiving signals of the antenna elements to conversion signals on a time axis before demodulation, first combining means for combining the conversion signals by multiplying the conversion signals on the time axis with a complex weight to obtain a combined signal after an adaptive combining, complex weight calculating means for calculating the complex weight based on the conversion signals and the combined signal, and first demodulating means for demodulating the combined signal to a demodulation signal on a frequency axis after the adaptive combining; and an equalizer unit including second combining means for extracting the known signal provided in the conversion signals on the time axis and combining extracted known signals by multiplying the extracted known signals with the complex weight calculated by the complex weight calculating means, second demodulating means for demodulating the combined signal of the second combining mean to a demodulation signal on a frequency axis, propagation path estimating means for estimating a propagation path estimation value based on the demodulated signal of the second demodulating means, and dividing means for dividing the demodulation signal of the first demodulating means after the adaptive combining by the propagation path estimation value.

6. An adaptive receiver according to claim 5, wherein:

the complex weight calculating means calculates the complex weight by using the demodulation signal of the first demodulating means after the adaptive combining in place of using the combined signal.

7. An adaptive receiver according to claim 6, wherein:

the complex weight calculating means includes converting means for converting to a signal on the time axis from a correlation vector calculated from the demodulation signal on the frequency axis after the adaptive combining in order to calculate the complex weight based on the signal on the time axis and the conversion signals on the time axis.

8. An adaptive receiver for a multi-carrier transmission system which transmits in parallel frequency-divided data provided with a known signal at a leading edge of data, comprising:

an adaptive array unit including an array antenna made up of a plurality of antenna elements, converting means for converting receiving signals of the antenna elements to conversion signals on a time axis before demodulation, first combining means for combining the conversion signals by multiplying the conversion signals on the time axis with a complex weight to obtain a combined signal after an adaptive combining, complex weight calculating means for calculating the complex weight based on the conversion signals and the combined signal, and first demodulating means for demodulating the combined signal to a demodulation signal on a frequency axis after the adaptive combining; and an equalizer unit including second combining means for extracting the known signal provided in the conversion signals on the time axis and combining extracted known signals by multiplying the extracted known signals with the complex weight calculated by the complex weight calculating means, second demodulating means for demodulating the combined signal of the second combining mean to a demodulation signal on a frequency axis, propagation path inverse characteristic estimating means for calculating a propagation path inverse characteristic estimation value based on the demodulation signal of the second demodulating means, and multiplying means for multiplying the demodulation signal of the first demodulating means after the adaptive combining with the propagation path inverse characteristic estimation value.

9. An adaptive receiver according to claim 8, wherein:

the complex weight calculating means calculates the complex weight by using the demodulation signal of the first demodulating means after the adaptive combining in place of using the combined signal.

10. An adaptive receiver according to claim 9, wherein:

the complex weight calculating means includes converting means for converting to a signal on the time axis from a correlation vector calculated from the demodulation signal on the frequency axis after the adaptive combining in order to calculate the complex weight based on the signal on the time axis and the conversion signals on the time axis.

11. An adaptive receiver for a multi-carrier transmission system which transmits in parallel frequency-divided data in a scattered pilot signal, comprising:

an adaptive array unit including an array antenna made up of a plurality of antenna elements to obtain a combined signal after an the adaptive combining by multiplying receiving signals received by the antennas with a complex weight for changing amplitude and phase of the receiving signals; and an equalizer unit including a known signal extracting means for extracting a known signal from a demodulation signal after the adaptive combining, propagation path estimating means for estimating a propagation path estimation value based on an extracted known signal, and equalizing means for executing equalization by dividing the demodulation signal after the adaptive combining by the propagation path estimation value.

12. An adaptive receiver according to claim 11, wherein:

the adaptive array unit includes demodulating means for demodulating the receiving signals of the antenna elements to demodulation signals on a frequency axis, combining means for combining the demodulation signals by multiplying the demodulation signals on the frequency axis with the complex weight to obtain the combined signal after the adaptive combining, and complex weight calculating means for calculating the complex weight based on the demodulation signals on the frequency axis and the combined signal after the adaptive combining.

13. An adaptive receiver according to claim 11, wherein:

the adaptive array unit includes converting means for converting the receiving signals of the antenna elements to conversion signals on a time axis before demodulation, combining means for combining the conversion signals by multiplying the conversion signals on the time axis with the complex weight to obtain the combined signal after the adaptive combining, complex weight calculating means for calculating the complex weight based on the conversion signals on the time axis and the combined signal after the adaptive combining, and demodulating means for demodulating the combined signal after the adaptive combining to a demodulation signal on a frequency axis after the adaptive combining.

14. An adaptive receiver according to claim 11, wherein:

the adaptive array unit includes converting means for converting the receiving signals of the antenna elements to conversion signals on a time axis before demodulation, combining means for combining the conversion signals by multiplying the conversion signals on the time axis with the complex weight to obtain the combined signal after the adaptive combining, demodulating means for demodulating the combined signal after the adaptive combining to a demodulation signal on a frequency axis, and complex weight calculating means for calculating the complex weight based on the conversion signals on the time axis and the demodulation signal after the adaptive combining.

15. An adaptive receiver according to claim 12, wherein:

the known signal extracting means extracts the known signal in unit of a predetermined number of symbols.

16. An adaptive receiver according claim 13, wherein:

the known signal extracting means extracts the known signal in unit of a predetermined number of symbols.

17. An adaptive receiver according to claim 14, wherein:

the known signal extracting means extracts the known signal in unit of a predetermined number of symbols.

18. An adaptive receiver according to claim 15, wherein:

the complex weight calculating means updates and output the complex weight in unit of the predetermined number of symbols.

19. An adaptive receiver according to claim 11, wherein:

the known signal extracting means extracts the known signal in unit of a predetermined number of symbols; and the adaptive array unit includes complex weight calculating means for calculating, in the unit of symbol, the complex weight based on the receiving signals of the antenna elements and the combined signal by multiplying the receiving signals with the complex weight, and sample-holding means for sample-holding of the complex weight in unit of the predetermined symbol; and the receiving signals of the antenna elements are multiplied with the complex weight sample-held by the sample-holding means.

20. An adaptive receiver according to claim 11, wherein:

the known signal extracting means extracts the known signal in unit of a predetermined number of symbols; and the equalizer unit includes delay means for delaying the signal after the adaptive combining as much as the time of the determined number of symbols before execution of equalization.

21. An adaptive receiver for a multi-carrier transmission system which transmits in parallel frequency-divided data in a scattered pilot signal, comprising:

an adaptive array unit including an array antenna made up of a plurality of antenna elements to obtain a demodulation signal after an the adaptive combining by multiplying receiving signals received by the antennas with a complex weight for changing amplitude and phase of the receiving signals; and an equalizer unit including a known signal extracting means for extracting a known signal from the demodulation signal after the adaptive combining, propagation path inverse characteristic estimating means for estimating a transmission path inverse characteristic estimation value based on an extracted known signal, and equalizing means for executing equalization by multiplying the demodulation signal after the adaptive combining with the transmission path inverse characteristic estimation value.

22. An adaptive receiver according to claim 21, wherein:

the adaptive array unit includes demodulating means for demodulating the receiving signals of the antenna elements to demodulation signals on a frequency axis, combining means for combining the demodulation signals by multiplying the demodulation signals on the frequency axis with the complex weight to obtain the combined signal after the adaptive combining, and complex weight calculating means for calculating the complex weight based on the demodulation signals on the frequency axis and the combined signal after the adaptive combining.

23. An adaptive receiver according to claim 21, wherein:

the adaptive array unit includes converting means for converting the receiving signals of the antenna elements to conversion signals on a time axis before demodulation, combining means for combining the conversion signals by multiplying the conversion signals on the time axis with the complex weight to obtain the combined signal after the adaptive combining, complex weight calculating means for calculating the complex weight based on the conversion signals on the time axis and the combined signal after the adaptive combining, and demodulating means for demodulating the combined signal after the adaptive combining to a demodulation signal on a frequency axis after the adaptive combining.

24. An adaptive receiver according to claim 21, wherein:

the adaptive array unit includes converting means for converting the receiving signals of the antenna elements to conversion signals on a time axis before demodulation, combining means for combining the conversion signals by multiplying the conversion signals on the time axis with the complex weight to obtain the combined signal after the adaptive combining, demodulating means for demodulating the combined signal after the adaptive combining to a demodulation signal on a frequency axis, and complex weight calculating means for calculating the complex weight based on the conversion signals on the time axis and the demodulation signal after the adaptive combining.

25. An adaptive receiver according to claim 22, wherein:

the known signal extracting means extracts the known signal in unit of a predetermined number of symbols.

26. An adaptive receiver according to claim 23, wherein:

the known signal extracting means extracts the known signal in unit of a predetermined number of symbols.

27. An adaptive receiver according to claim 24, wherein:

the known signal extracting means extracts the known signal in unit of a predetermined number of symbols.

28. An adaptive receiver according to claim 25, wherein:

the complex weight calculating means updates and output the complex weight in unit of the predetermined number of symbols.

29. An adaptive receiver according to claim 21, wherein:

the known signal extracting means extracts the known signal in unit of a predetermined number of symbols; and the adaptive array unit includes complex weight calculating means for calculating, in the unit of symbol, the complex weight based on the receiving signals of the antenna elements and the combined signal by multiplying the receiving signals with the complex weight, and sample-holding means for sample-holding of the complex weight in unit of the predetermined symbol; and the receiving signals of the antenna elements are multiplied with the complex weight sample-held by the sample-holding means.

30. An adaptive receiver according to claim 21, wherein:

the known signal extracting means extracts the known signal in unit of a predetermined number of symbols; and the equalizer unit includes delay means for delaying the signal after the adaptive combining as much as the time of the determined number of symbols before execution of equalization.

* * * * *